United States Patent
Bolton et al.

(10) Patent No.: US 12,150,033 B1
(45) Date of Patent: Nov. 19, 2024

(54) SYSTEMS AND METHODS FOR GENERATING AND PRESENTING A LIVE CONNECTIVITY MAP

(71) Applicant: Rivian IP Holdings, LLC, Plymouth, MI (US)

(72) Inventors: Mariko Bolton, Norwalk, CA (US); Nicholas Butler, Mill Valley, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 18/199,688

(22) Filed: May 19, 2023

(51) Int. Cl.
H04W 40/24 (2009.01)
(52) U.S. Cl.
CPC ................................ *H04W 40/248* (2013.01)
(58) Field of Classification Search
CPC .................................................. H04W 40/248
See application file for complete search history.

(56) References Cited

U.S. PATENT DOCUMENTS

| | | | | |
|---|---|---|---|---|
| 8,270,986 B1* | 9/2012 | Nucci | .................... | H04W 72/51 |
| | | | | 455/452.2 |
| 2004/0203718 A1* | 10/2004 | Knauerhase | .......... | H04W 48/16 |
| | | | | 455/423 |
| 2015/0261412 A1* | 9/2015 | Guillama | .............. | G06F 3/0482 |
| | | | | 715/835 |
| 2017/0325111 A1* | 11/2017 | Reese | ..................... | H04L 43/50 |
| 2019/0041227 A1* | 2/2019 | Shetty | .................. | G05D 1/0285 |
| 2021/0044946 A1* | 2/2021 | Bhaskaran | ............ | H04W 76/14 |
| 2023/0199612 A1* | 6/2023 | Butler | ................... | H04W 84/06 |
| | | | | 455/418 |

OTHER PUBLICATIONS

"5G & 4G Coverage Map", 5G & 4G Coverage Map Check Your Cell Phone Service T-Mobile, Retrieved from: https://www.t-mobile.com/coverage/coverage-map, retrieved on May 25, 2023, 3 pages.
"AT&T Maps- Wireless Coverage Map for Voice and Data Coverage from AT&T", Retrieved from: https://www.att.com/maps/wireless-coverage.html, retrieved on May 25, 2023, 1 page.
"Explore Verizon 5G and 4G LTE network coverage in your area." Retrieved from: https://www.verizon.com/coverage-map/, retrieved on May 25, 2023, 4 pages.
"Hexagonal hierarchical geospatial indexing system", H3 Geo, Retrieved from: https://h3geo.org/, retrieved on May 25, 2023, 2 pages.
"Mobile LTE Coverage Map", Federal Communication Commission, Retrieved from: https://www.fcc.gov/BroadbandData/MobileMaps/mobile-map, Aug. 6, 2021, 3 pages.

* cited by examiner

*Primary Examiner* — Cao H Nguyen
(74) *Attorney, Agent, or Firm* — Haley Guiliano LLP

(57) ABSTRACT

Systems and methods are provided for facilitating for display connectivity data of devices on a connectivity map. The systems and methods are configured to collect carrier data for the devices associated with a plurality of carriers and device data from the devices. The systems and methods are further configured to determine connectivity data and geographical data for the devices based on the carrier data and the device data and present the connectivity data for the devices on the connectivity map based on the geographical data.

16 Claims, 11 Drawing Sheets

SYSTEMS AND METHODS FOR GENERATING AND PRESENTING A LIVE CONNECTIVITY MAP

The present disclosure is directed to facilitating for display connectivity data of devices to identify outages and types of outages across service providers.

SUMMARY

Reliable and robust device connectivity is increasingly important for consumer and commercial vehicles, vehicle fleets, chargers, other Wi-Fi enabled devices, other cellular-enabled devices, and Internet-of-Things (IoT) devices. For example, connected vehicles may require connectivity to provide features such as over-the-air (OTA) updates, advanced driver assistance systems (ADAS), telematics, vehicle control, etc. Many traditional vehicle original equipment manufacturers (OEMs) or fleet managers rely on a single cellular carrier (e.g., per region or country) to provide cellular coverage to all vehicles. However, reliance on a single cellular carrier often does not allow vehicles to take advantage of other available cellular carriers or other wireless networks that may offer improved service range, more consistent connectivity, faster download/upload speed, cheaper rates, etc. Additionally, reliance on a single cellular carrier may offer little insight into and control of connectivity for each of the devices.

In accordance with the present disclosure, methods and systems are presented to collect carrier data for at least one device from multiple carriers, collect device data from the devices, determine connectivity data and geographical data for the devices based on the carrier data and the device data, and facilitate for display, based on the geographical data, the connectivity data for the devices on a connectivity map.

In some embodiments, the connectivity data for each device may be an online status, an offline status, or a dormant status, or a combination thereof. The connectivity data for each device may be displayed by at least one icon on the connectivity map, where each icon corresponds to a geographic region and each icon has a respective color to indicate a percentage of devices within the geographic region corresponding to the icon having an online status and respective fill size to indicate a percentage of devices within the geographic region corresponding to the icon having a dormant status.

In some embodiments, facilitating for display the connectivity data for the devices may include displaying hexagonal icons on the connectivity map, each hexagonal icon corresponding to a geographic region. In some embodiments, a connectivity management platform (CMP) may receive a zoom-in command, which increases a granularity of the hexagonal icons. When the CMP receives a zoom-out command, the granularity of the hexagonal icons presented on the connectivity map is reduced.

The devices presented on the connectivity map may include vehicles, chargers, or any other suitable IoT device that is cellular-enabled, or Wi-Fi enabled. The connectivity map may filter the connectivity data for the devices presented by any one of the following categories: third-party company, carrier, geographic region, device type, or connectivity data type, or a combination thereof.

In some embodiments, the connectivity map may display a call-to-action interface, which may include any one of the following actions: diagnostic testing, displaying device details, resetting device network settings, or resetting a device, or a combination thereof.

In some embodiments, the device data is collected more frequently than the carrier data. Therefore, determining the connectivity data and geographical data for the devices may include determining a most recently collected carrier data and device data and determining the connectivity data and geographical data for the devices based on the most recently collected carrier data and device data.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
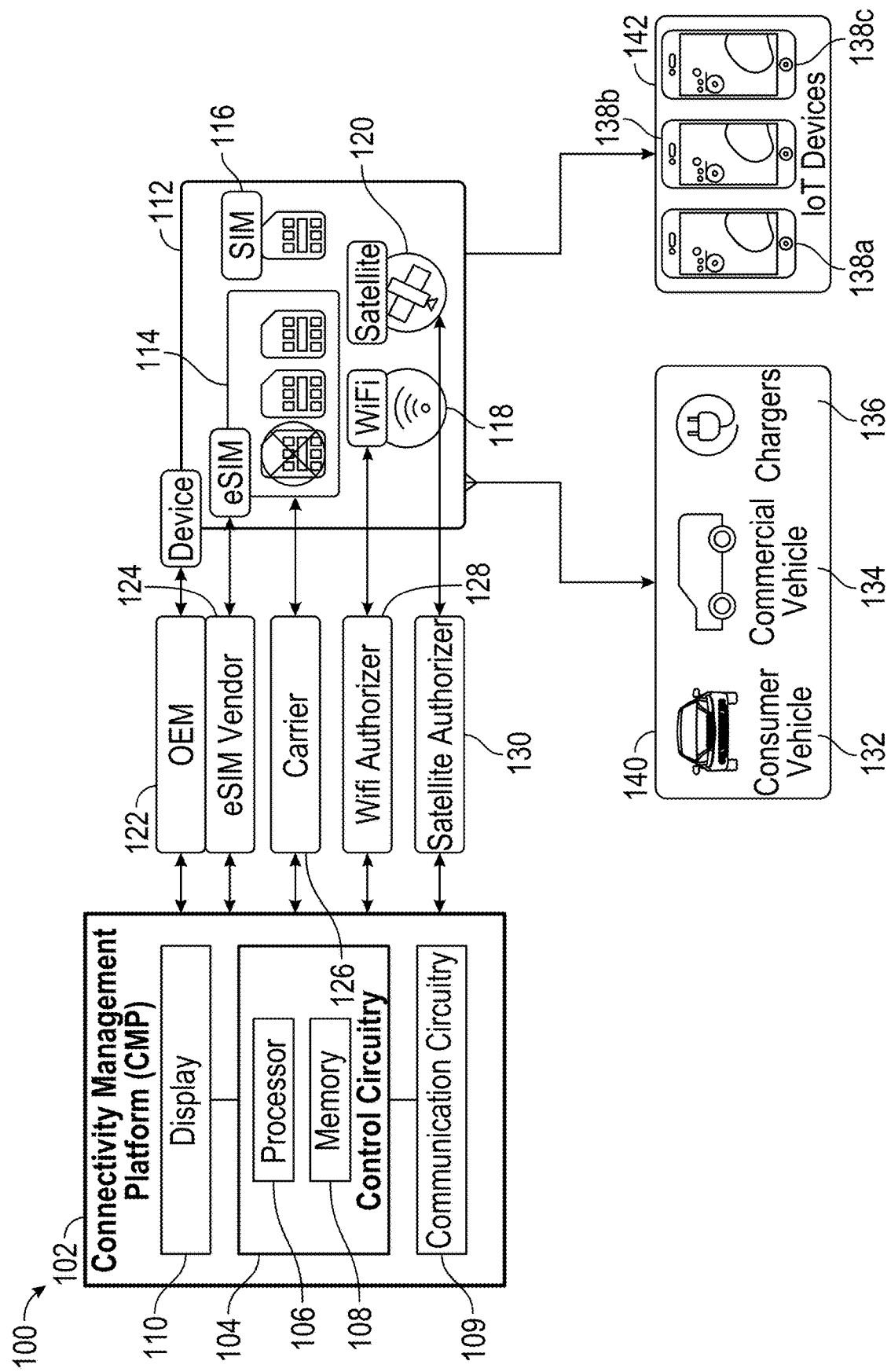
FIG. 1 shows a system architecture, in accordance with some embodiments of the present disclosure.

The present disclosure is directed to facilitating for display connectivity data of devices (e.g., vehicles, chargers, IoT devices, etc.) on a centralized connectivity map based on the geographical data. More specifically, the present disclosure is directed to aggregating device data, carrier data, and/or SIM/eSIM data to provide information to a user of the connectivity map, which facilitates identifying connectivity outages and outage types across a geographic region.

For a given device that is connected to a cellular network provided by a carrier, carrier data may be accessed periodically (i.e., every few hours) via a carrier-specific portal or web application. However, with such a carrier-specific portal or web application, there is no ability to identify connectivity outages or outage types for the carrier that have occurred between each carrier data update, which may take hours. Therefore, by using device data, which may be accessed in real time from each given device using the same or a different communication network, the connectivity management platform (CMP) enables a user to immediately identify when any network connectivity outages occur without requiring the user to navigate through multiple carrier portals or web applications.

In accordance with some embodiments of the present disclosure, systems and methods are provided for presenting connectivity data of devices on a centralized graphical user interface (GUI) (e.g., the connectivity map). For example, the connectivity map collects carrier data associated with a plurality of carriers and device data from each of the devices. The CMP then presents the connectivity data on the connectivity map based on the geographical data associated with each device. In some embodiments, the devices include any devices that are Wi-Fi-enabled and/or Cellular-enabled, including commercial and consumer vehicles, chargers, or any other suitable Internet-of-Things (IoT) devices. A user of the CMP may access connectivity data for the devices within a geographical region presented on the connectivity map by selecting an icon on the connectivity map. This allows the user to quickly access a detailed view of connectivity issues for devices within the geographical region across multiple carriers, diagnose the connectivity issues and troubleshoot in order to resolve the network connectivity issues.

In some embodiments, the carrier data may include session data, such as session status, as well as length of the data session and data session activity. In some embodiments, the device data may include vehicle data, charger data, or other device data such as signal (Wi-Fi/Cellular) strength, signal quality, and device activity status (sleep/deep sleep/dormant/offline/online).

In some embodiments, the connectivity map is capable of filtering the connectivity data in order to present data based on one of the following filter categories: third-party company, carrier, geographic region, device type, or connectivity data type. In some embodiments, the connectivity data presented on the connectivity map may include an online status, an offline status, a dormant status, or a combination thereof.

In some embodiments, the connectivity map includes a call-to-action interface, which enables the user to view details of a respective device, reset network settings of the respective device, run network diagnostics, reconfigure network settings for the respective device, or reset the respective device.

FIG. 1 shows a system architecture 100, in accordance with some embodiments of the present disclosure. As shown, the system architecture 100 includes a connectivity management platform (CMP) 102. In some embodiments, the CMP 102 may manage connectivity for a plurality of communication devices 112 in a plurality of systems 140 and 142 (e.g., electric vehicle systems 140 and IoT device systems 142). The CMP 102 may include control circuitry 104 (e.g., including a processor 106 and memory 108) and communication circuitry 109. The processor 106 may include a hardware processor, a software processor (e.g., a processor emulated using a virtual machine), or any combination thereof. In some embodiments, the processor 106 and memory 108 in combination may be referred to as the control circuitry 104. In some embodiments, the processor 106 alone may be referred to as the control circuitry 106. The memory 108 may include hardware elements for non-transitory storage of commands or instructions, that, when executed by the processor 106, cause the processor 106 to act in accordance with embodiments described above and below. As referred to herein, the control circuitry 104 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, the control circuitry 104 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the CMP 102 may be implemented with one or more servers. In some embodiments, the CMP 102 may also include a display 110.

A SIM card may refer to a microchip card, or an embedded SIM (eSIM) on a chip, inserted into a terminal, used to identify a device across mobile networks. This may be a SIM, micro SIM, uSIM, iSIM, or any other type of SIM card or SIM on a chip (e.g., integrated circuit component. Additionally, the functions and architecture described below may be implemented by the system of FIG. 1, or by any of the other systems illustrated in the attached figures or described in greater detail below.

As shown, each of the devices 112 may incorporate an eSIM card 114, a SIM card 116, a Wi-Fi module 118, and a satellite module 120. In some embodiments, each of the devices 112 is managed by a respective original equipment manufacturer 122 (OEM) and each of the eSIMs is managed or sold by a respective eSIM vendor 124. Carrier 126 may be one of a plurality of carriers that provide cellular connectivity to each of the devices 112 through the eSIM card 114 (or through the SIM card 116). Wi-Fi authorizer 128 may be one of a plurality of Wi-Fi authorizers that provides Wi-Fi connectivity to each of the devices 112 through the Wi-Fi module 118. Satellite authorizer 130 may be one of a plurality of satellite authorizers that provide satellite connectivity to each of the devices 112 through the satellite module 120. As explained in further detail below, the CMP 102 may couple the eSIM card of each of the plurality of devices 112 to, for example, a cellular carrier to provide connectivity to the plurality of devices. In some embodiments, the CMP may couple the eSIM card of the plurality of devices to a Wi-Fi network or satellite in order to provide connectivity. As shown, the systems 140 may include, e.g., a consumer vehicle 132, a commercial vehicle 134, and chargers 136, while the system 142 may include, e.g., a plurality of IoT devices 138a-138c. In some embodiments, the systems 140 and the IoT devices 142 may include any suitable device that is Wi-Fi enabled or cellular-enabled.

Figure 2:
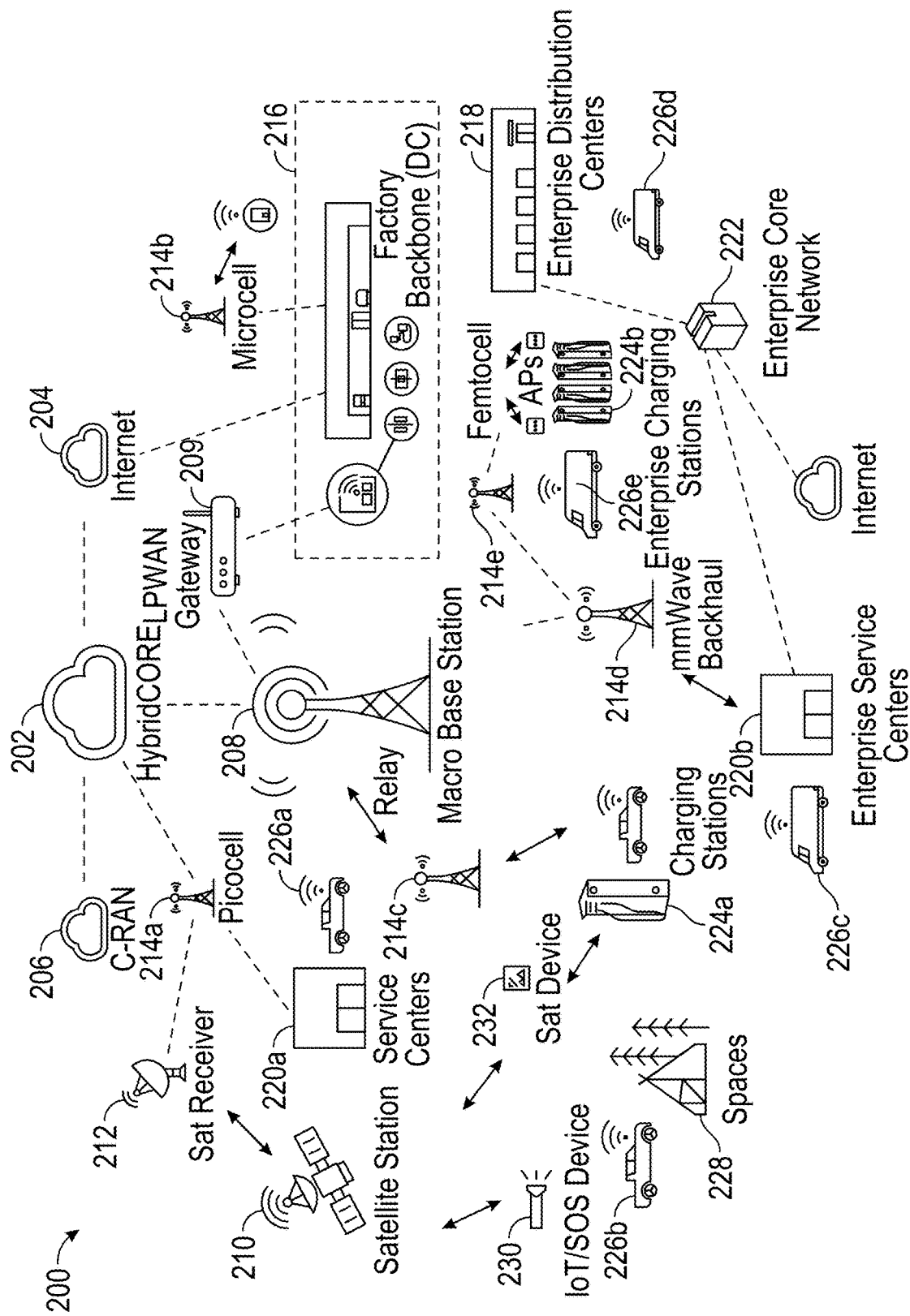
FIG. 2 shows a network infrastructure, in accordance with some embodiments of the present disclosure.

FIG. 2 shows a network infrastructure 200, in accordance with some embodiments of the present disclosure. FIG. 2 provides a visual overview of how a CMP (e.g., the CMP 102), via a macro base station 208, communicates to a plurality of devices (e.g., consumer vehicles 226a, 226b; commercial vehicles 226c, 226d, 226e; charging stations 224a, 224b; IoT device 230; satellite (SAT) device 232, etc.) to monitor/access connectivity data. For example, the CMP may communicate with the plurality of devices via Hybrid-CORE 202, internet 204, centralized-RAN (C-RAN) 206, low-power wide-area network (LPWAN) gateway 209, satellite station 210, sat receiver 212, enterprise core network 222, factory backbone 216, enterprise distribution center 218, service centers 220a, 220b, spaces 228, etc. As shown, FIG. 2 may include a variety of networks (e.g., cellular, private cellular, Wi-Fi, satellite, etc.), which provide connectivity to the plurality of devices by coupling to their respective communication modules (e.g., eSIM card 114, SIM card 116, Wi-Fi module 118, and Satellite module 120). Although various types of networks and network devices are illustrated, it should be understood that the network infrastructure 200 may include any suitable networks and network devices for providing and managing connectivity to a plurality of devices.

Figure 3:
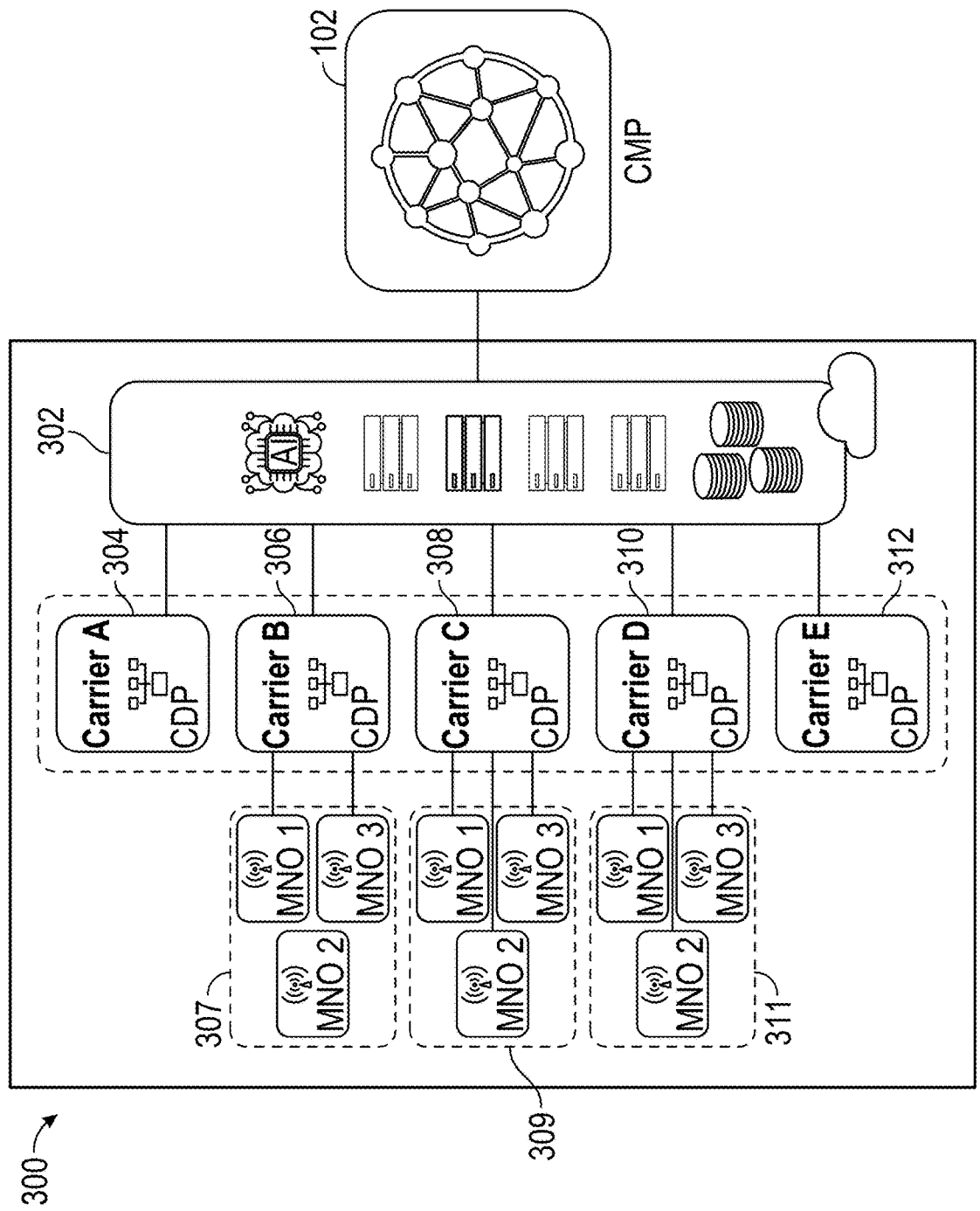
FIG. 3 shows a diagram of a system architecture for collecting carrier data from multiple carriers, in accordance with some embodiments of the present disclosure.

FIG. 3 shows a diagram 300 of a system architecture for collecting carrier data from multiple carriers, in accordance with some embodiments of the present disclosure. FIG. 3 includes a plurality of carriers 304, 306, 308, 310, and 312, which are compatible to route connectivity data and device data to the CMP 102. The plurality of carriers 304-312 may adhere to any data link layer protocol to transfer connectivity data and device data between nodes and in communication with the CMP 102. As shown, each of carrier B 306, carrier C 308, and carrier D 310 may include respective mobile network operators (MNOs) 307, 309, and 311 to provide wireless connectivity to a plurality of devices coupled to the CMP 102 (e.g., through cloud services 302).

Figure 4:
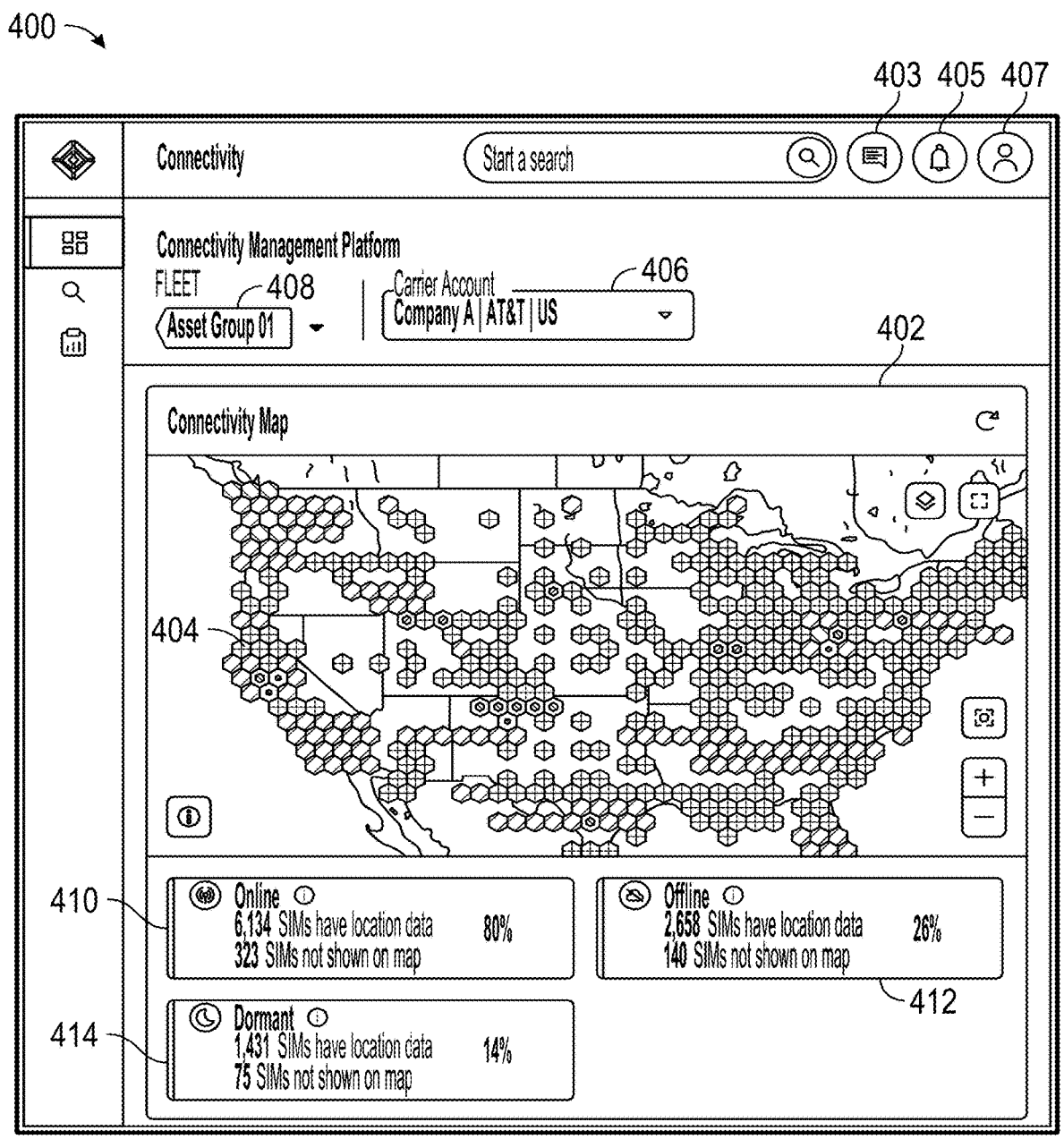
FIG. 4 shows an illustrative depiction of an implementation of a connectivity management platform (CMP), in accordance with some embodiments of the present disclosure.

FIG. 4 shows an illustrative depiction of an implementation of a CMP 400, in accordance with some embodiments of the present disclosure. CMP 400 includes a connectivity map 402, shown on the display of the CMP 400 to present aggregated connectivity data and geographical data for devices from multiple carriers. The CMP may also include interactive toolbar buttons such as a chat button 403, a notification button 405, and a user profile button 407. In some embodiments, the chat button 403 may be used in order to interact with an internal chat tool for the CMP 400. In some embodiments, the notification button 405 is used to interact with a notification interface (e.g., a notification panel). The notification interface may be used to present connectivity data alerts for at least one device, for at least one carrier, and/or at least one geographical region represented by icons 404 on the connectivity map 402. The connectivity data alerts may vary from an informational notification to an error in network connectivity of a region. In some embodiments, the user profile button 407 may be used to access information of the user profile or personal preferences of the connectivity map 402 for the user.

The connectivity map 402 may include online device data information 410, offline device data information 412, and dormant device data information 414. The online device data information 410 may include a total number of devices (e.g., total number of SIM cards) having an online status. In some embodiments, the online device data information 410 includes an online device percentage, which may be defined by a ratio of the number of online devices to the total number of online devices and dormant devices. In some embodiments, the online device percentage may be the number of online devices to the total number of devices presented. In some embodiments, an online device is a device that has an open data session or maintains a connection to a network (e.g., a cellular network or Wi-Fi network). The offline device data information 412 may include a total number of devices (e.g., total number of SIM cards) having an offline status. In some embodiments, the offline device data information 412 includes an offline device percentage, which may be defined by the ratio of the number of offline devices to the total number of devices presented. An offline device may include any device that was previously detected to be online, but the session has prematurely ended. In some embodiments, an offline device may be any device wherein the device is unexpectedly disconnected from a network (e.g., a cellular network or a Wi-Fi network). In some embodiments, an offline status may correspond to a device when the device prematurely ends a data session or if the device is offline due to poor cellular/Wi-Fi coverage (i.e., signal strength, signal quality, or throughput). The dormant device data information 414 may include a total number of devices (e.g., total number of SIM cards) having a dormant status. In some embodiments, the dormant device data information 414 includes a dormant device percentage, which may be defined by the ratio of the number of dormant devices to the total number of devices presented. A dormant device may be a device that is available to be online but has not held a session for a predetermined period of time. In some embodiments, a dormant device may include devices which are in a sleep mode or power-saving mode. In some embodiments, a dormant device is a device that has been left idle or dormant with no interaction from a user. For example a dormant device may be one of a vehicle parked at an airport for weeks, a charger not being used and is in a sleep mode, or an IoT device that is in low power mode from inactivity. In some embodiments, a dormant device may include devices for which no signals have been received for a predetermined amount of time (e.g., 60 or 90 minutes). In some embodiments, the criteria for determining whether a device is dormant depends on the device type (e.g., vehicle or charger). In some embodiments, the devices may include a consumer vehicle, a commercial vehicle, chargers, or any suitable IoT device. In some embodiments, some devices may be represented in any one of the online device data information 410, the offline device data information 412, and the dormant device data information 414 but not presented on the connectivity map 402 because of omitted or missing geographical data.

The connectivity data of the devices may be represented by icons (such as icon 404), where each icon is associated with a geographical region. In some embodiments, each icon has a color and a fill size, which may correspond to the offline device percentage and the dormant device percentage for the devices within the geographical region of the icon, respectively. In some embodiments, each respective icon may include and present additional information including device density within the geographic region corresponding to the respective icon. For example, a geographic region that has a high device density, may present an icon that is slightly raised above the connectivity map and other adjacent icons that have lesser device densities. In some embodiments, each icon on the connectivity map has the same size (i.e., corresponds to the same geographic area). In some embodiments, the size of the icons on the connectivity map varies. For example, smaller icons may be used in a geographic region having a high device density to show more granularity and/or larger icons may be used in a geographic region having a low device density.

The CMP 400 may also include a carrier account selection interface 406 (e.g., a dropdown menu) and an asset group selection interface 408 (e.g., a dropdown menu). In some embodiments, the carrier account selection interface 406 may filter the presented icons (such as icon 404) to show a subset of devices based on the company that owns or is associated with the subset of devices (e.g., an automotive company or a delivery company), the network carrier, or the country. In some embodiments, the asset group selection interface 408 may filter the presented icons to show a subset of devices based on a selection of the asset group. Each asset group may include devices based on a customized user configuration. In some embodiments, the CMP 400 may also filter the connectivity data of each device based on types of devices and connectivity data types. In some embodiments, when a user modifies the filters via the carrier account selection interface 406 or the asset group selection interface 408, the presented icons (such as icon 404) are updated to present icons based on the connectivity data and geographical data of devices based on the filter modifications.

Figure 5:
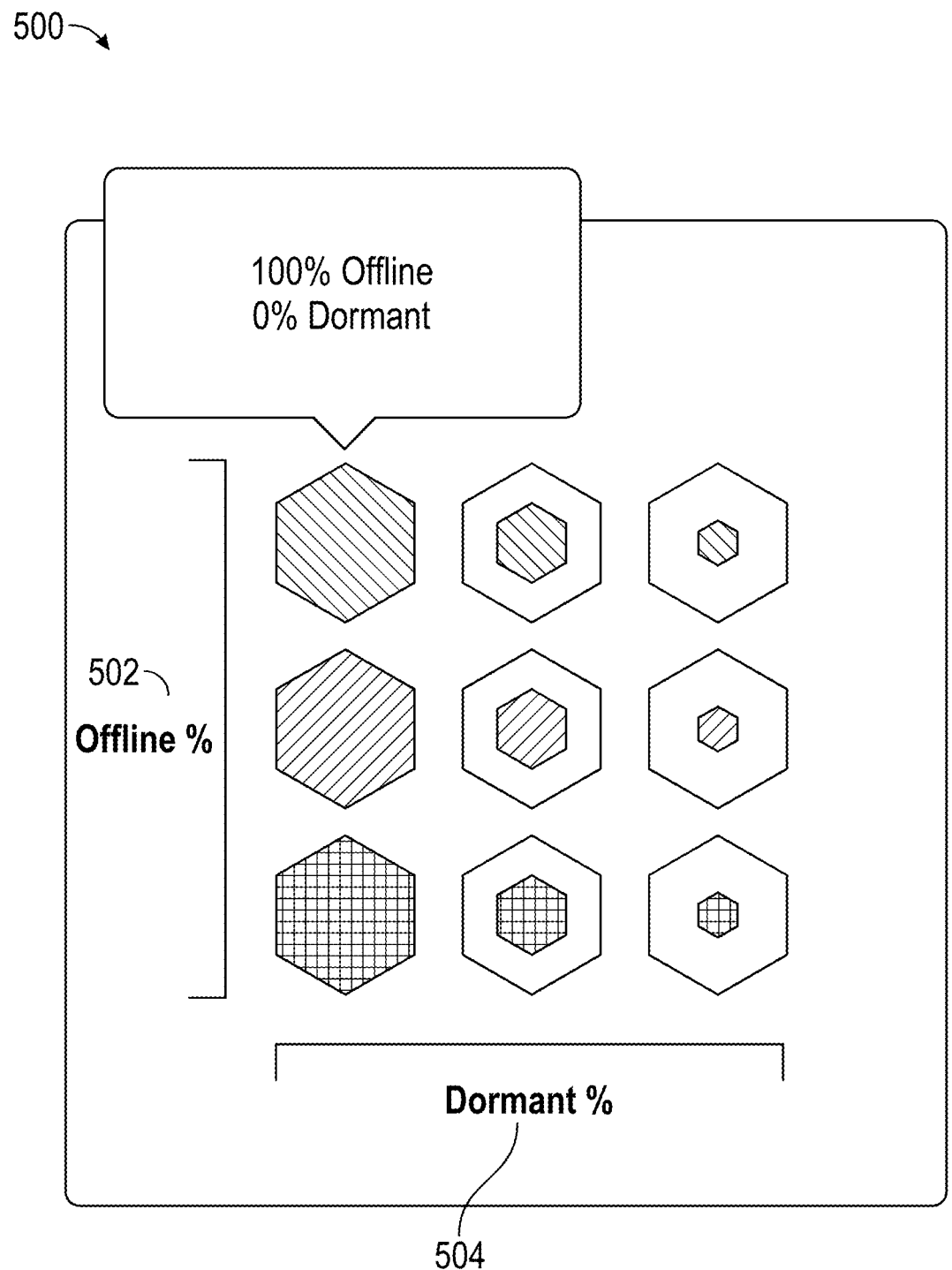
FIG. 5 shows an illustrative depiction of a legend for colors and fill sizes of hexagonal icons, in accordance with some embodiments of the present disclosure.

FIG. 5 shows an illustrative depiction of an informational legend 500 for colors and fill sizes of hexagonal icons, in accordance with some embodiments of the present disclosure. The legend 500 may improve the readability of the connectivity map, by conveying connectivity data through illustrations and/or colors.

As shown in FIG. 5, varying colors, which are represented by different fill patterns, may indicate an offline device percentage of a range of offline device percentages 502 for a respective icon. The offline device percentage may be defined as the ratio of the number of offline devices to the total number of devices located within the geographical region of the hexagonal icon. An offline device may include any device that was previously detected to be online, but the session has ended unexpectedly. In some embodiments, the fill size of a respective icon may represent a dormant device percentage of a range of dormant device percentages 504, where the fill size decreases as the dormant device percentage increases. The dormant device percentage may be defined as the ratio of the number of dormant devices to the total number of devices. A dormant device may be a device that is available to be online but has not held a session for a predetermined period of time. A dormant device may include devices which are in a sleep mode or power-saving mode.

Legend 500 shows a three tier granularity (i.e., high, medium, and low) for each of the offline device percentages 502, and the dormant device percentages 504. In some embodiments, the colors and fill sizes for each of the respective offline device percentages and the dormant device percentages may have greater granularity that indicate a more precise percentage based on the illustrative icon. In some embodiments, legend 500 may be accessed by a user via the connectivity map displayed on the CMP.

Figure 6:
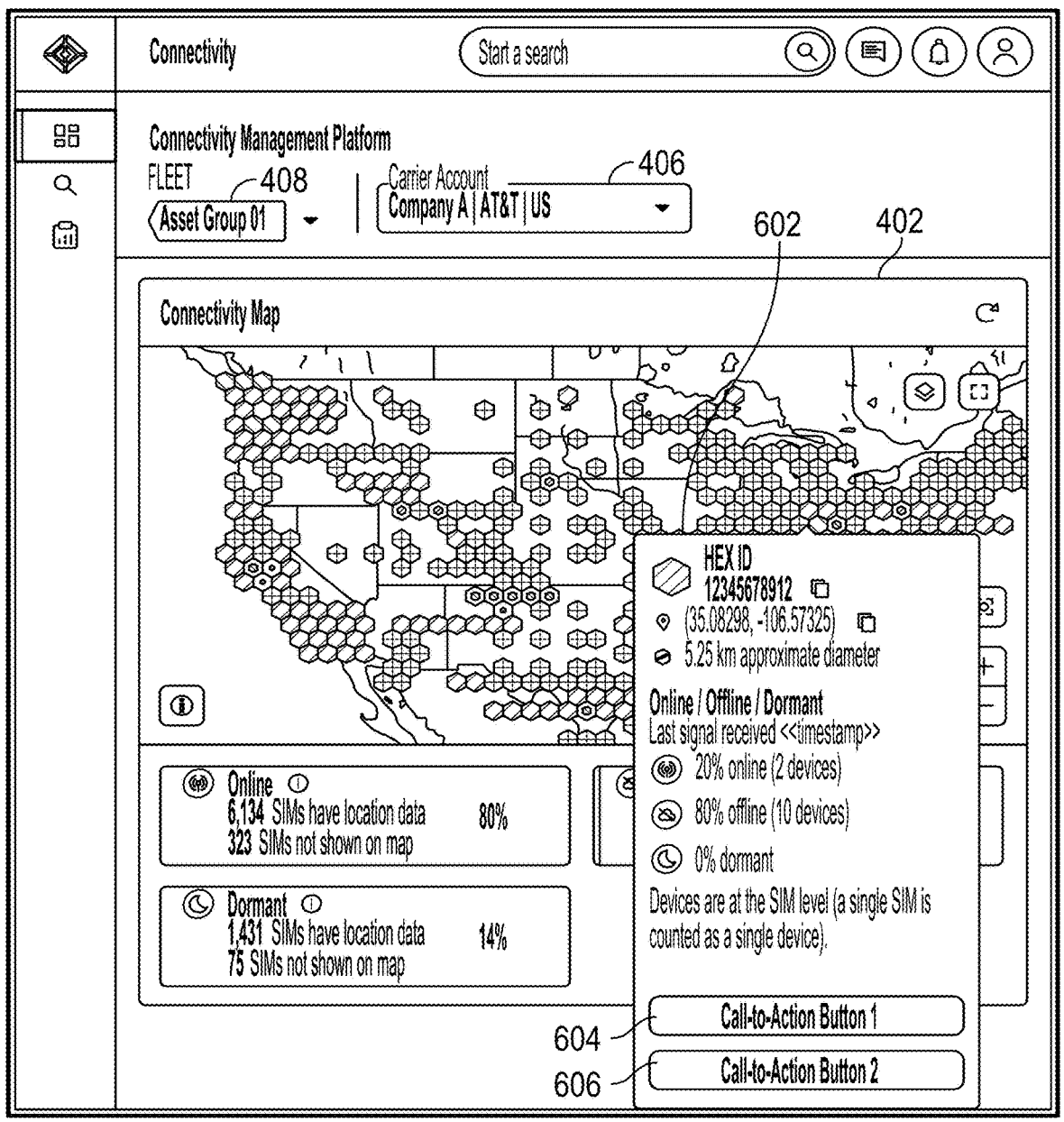
FIG. 6 shows another illustrative depiction of an implementation of a CMP with a detailed overlay view for a hexagonal icon, in accordance with some embodiments of the present disclosure.

FIG. 6 shows another illustrative depiction of an implementation of a CMP 600 with a detailed overlay view 602 for a hexagonal icon, in accordance with some embodiments of the present disclosure. In some embodiments, the detailed overlay view 602 may include any of the following: an icon identification number, geographical coordinates of the icon, the diameter for the geographical region represented by the icon, a timestamp of last received connectivity data update, online device data information for the devices associated with the icon, offline device data information for the devices associated with the icon, and dormant device data information for the devices associated with the icon.

In some embodiments, the detailed overlay view 602 includes a call-to-action interface (e.g., call-to-action button 1 604 and call-to-action button 2 606). In some embodiments, when the call-to-action buttons (604 and 606) are selected, any one of the following actions may be taken: reset the network settings of at least one device associated with the icon, reset at least one device associated with the icon, view advantaged settings or advanced settings for the selected icon, view network diagnostic tools, or troubleshoot network issues, or a combination thereof.

In some embodiments, the detailed overlay view 602 may be accessed by selecting an icon. In response to an icon selection, the CMP 600 may display the detailed overlay view 602 adjacent to the selected icon and may indicate the selected icon by highlighting or visually displaying a connection from the selected icon to the detailed overlay view 602.

Figure 7A:
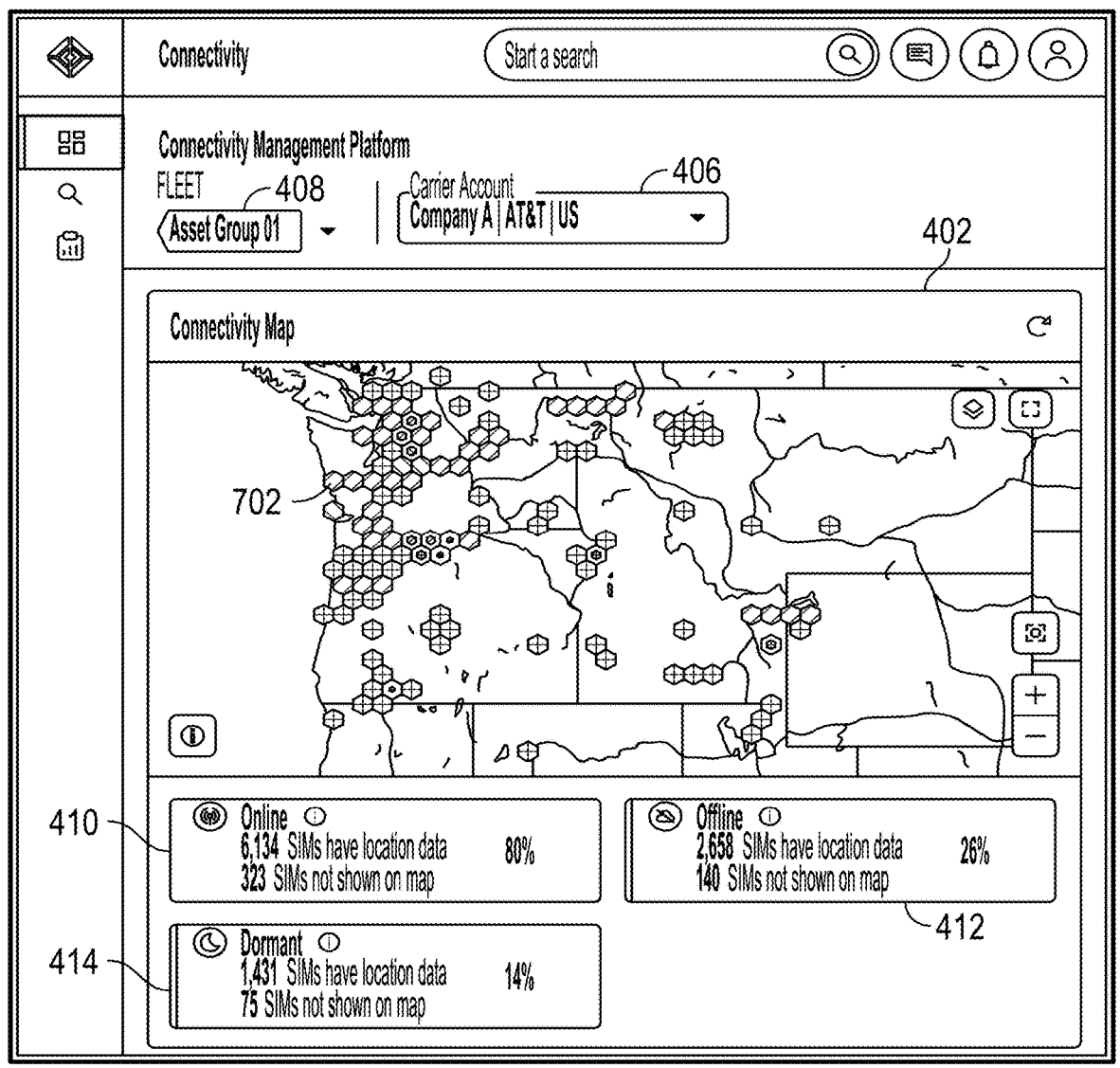
FIGS. 7A and 7B each show an illustrative depiction of an instance of a CMP of a region, in accordance with some embodiments of the present disclosure.
Figure 7B:
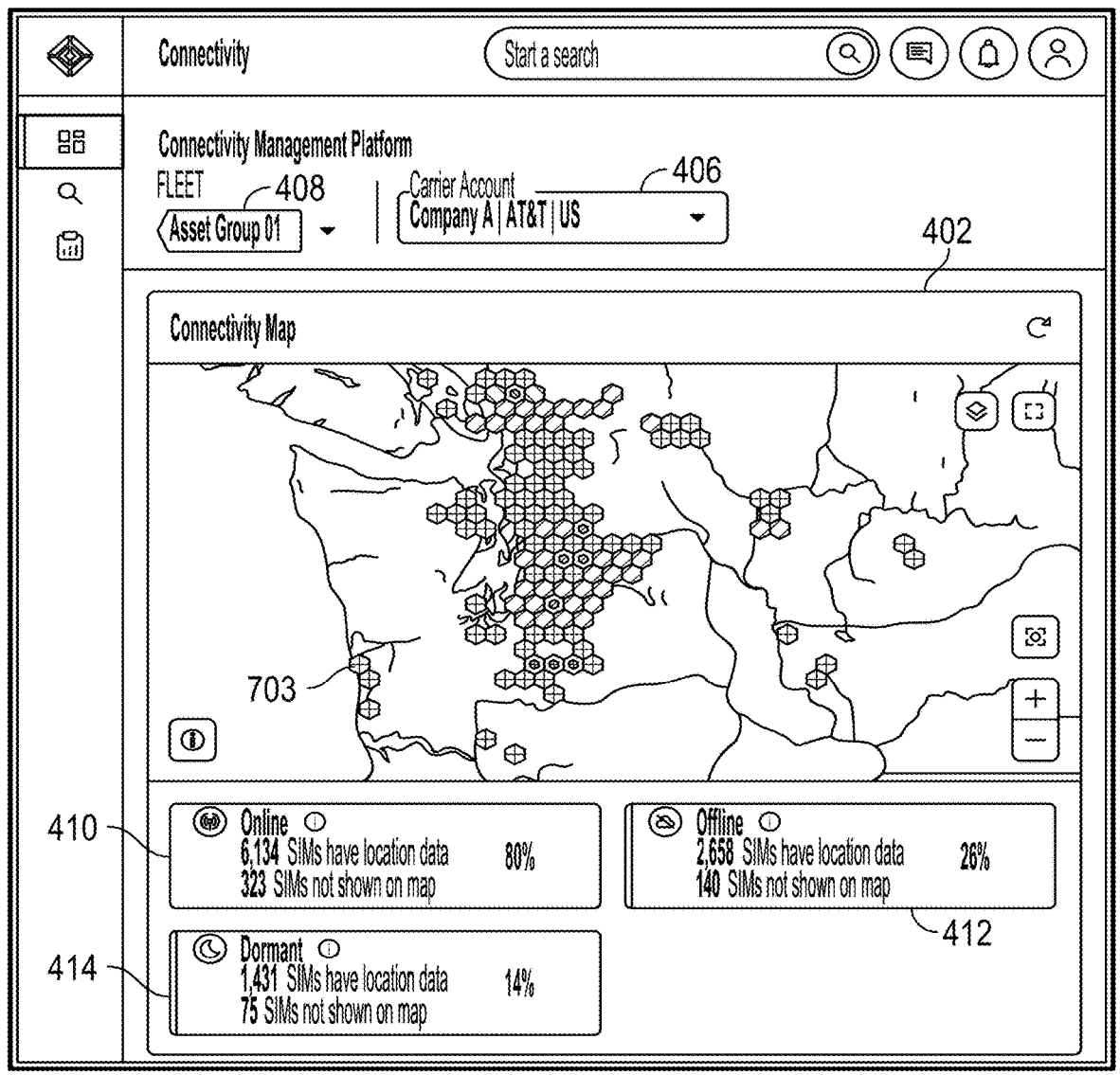

FIGS. 7A and 7B each show an illustrative depiction of an instance of a CMP (first instance 700 of CMP and second instance 701 of the CMP) of a region, in accordance with some embodiments of the present disclosure. The first instance 700 of the CMP includes a display that presents a zoomed out connectivity map 402 with a first hexagonal icon 702. The second instance 701 of the CMP includes a display that presents a zoomed in subregion of the connectivity map 402 with a second hexagonal icon 703. In some embodiments, the granularity of each hexagonal icon may be updated when a zoom command is received by the CMP. When a zoom-in command is received by the CMP, the geographical area associated to each hexagonal icon decreases and the granularity of the connectivity data for the hexagonal icons increases. When a zoom-out command is received by the CMP, the geographical area associated to each hexagonal icon increases and the granularity of the connectivity data for the hexagonal icons decreases. In some embodiments, there may be a minimum granularity such that zooming in beyond a certain point will not cause the geographical area associated to each hexagonal icon to decrease.

In some embodiments, zooming into or out of the connectivity map 402 may not update online device data information 410, offline device data information 412, and dormant device data information 414. In some embodiments, when the hexagonal icons are updated in the second instance 701 of the CMP, including the second hexagonal icon 703, the respective color and fill sizes for each updated hexagonal icon may update based on the connectivity data for the devices geographically located within the updated hexagonal icons (e.g., the second hexagonal icon 703).

Figure 8:
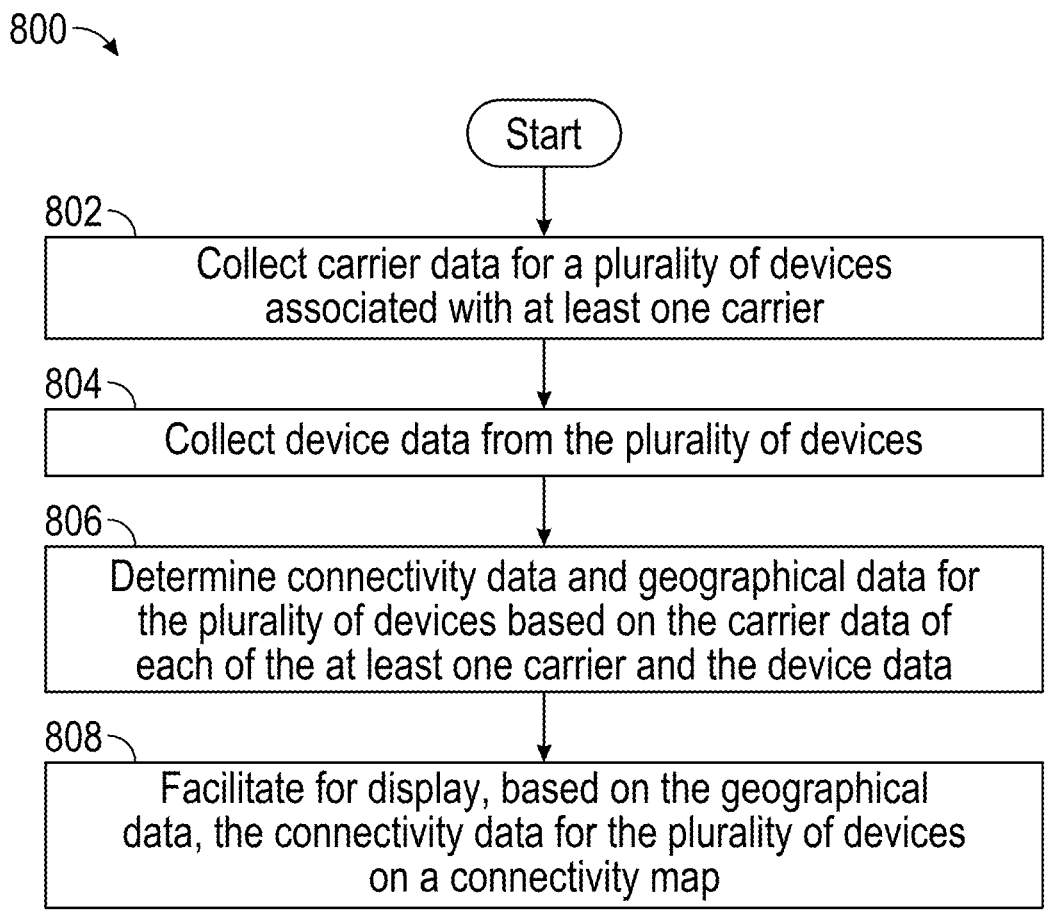
FIG. 8 shows a flowchart of an illustrative process to present connectivity data of devices on the CMP, in accordance with some embodiments of the present disclosure.

FIG. 8 shows a flowchart of an illustrative process 800 to present the connectivity data of each device on a CMP, in accordance with some embodiments of the present disclosure. In some embodiments, process 800 is executed by control circuitry 104 of the CMP 102.

At 802, the control circuitry collects carrier data for a plurality of devices from at least one carrier. In some embodiments, the control circuitry collects carrier data for the plurality of devices from multiple carriers. In some embodiments, the carrier data may include session data, such as session status, as well as length of the data session and data session activity. The carrier data may include carrier data from multiple carriers by accessing the data via an eSIM card (or through multiple SIM cards). In some embodiments, the carrier data may be provided periodically or accessed in response to the control circuitry requesting the carrier data.

At 804, the control circuitry collects device data from the plurality of devices. In some embodiments, the device data may include vehicle data, charger data, or other device data such as signal (Wi-Fi/Cellular) strength, signal quality, and device activity status (sleep/deep sleep/dormant/offline/online). The device data may also include global positioning system (GPS) data or other suitable geographical location/ positioning data. In some embodiments, the devices may periodically send the device data, or the control circuitry may access the device data by sending a request. In some embodiments, the device data may be collected over different networks. For example, a vehicle may be communicatively coupled to a Wi-Fi network and a cellular network provided by a carrier. The CMP may receive the carrier data from the carrier based on its connection to the vehicle. In addition, the CMP may receive the device data from the device over the Wi-Fi network.

At 806, the control circuitry determines connectivity data and geographical data for the plurality of devices based on the carrier data and the device data. In some embodiments, the connectivity data of the device may be enumerated, by the control circuitry, into an offline status, an online status, a dormant status, or a combination thereof. The connectivity data of a device may be determined based on the carrier data and device data, but in some cases, a device may send a signal to the CMP which may include information regarding the connectivity data of the device. For example, when a device is entering a power-savings mode or sleep mode, the device may send a signal to the CMP indicating that it has a dormant status. In some embodiments, the geographical data may be determined by the control circuitry based on the GPS data or other suitable geographical location/positioning data of the device data. In some embodiments, the geographical data may be determined by the control circuitry based on the carrier data based on relative geographical location data from cell tower signal pings/handshakes, Wi-Fi connection data, or other suitable device data for locating the device. In some embodiments the control circuitry of the CMP determines the connectivity data and geographical data for each of the devices based on the carrier data and the device data.

At 808, the control circuitry facilitates for display, based on the geographical data, the connectivity data for the plurality of devices on a connectivity map. In some embodiments, the connectivity data of the devices may be represented by icons (e.g., hexagonal icons), each icon associated with a geographical region. Each icon has a color and a fill size, which may correspond to an offline device percentage and a dormant device percentage, respectively. The offline device percentage may be defined as the ratio of the number of offline devices to the total number of devices located within the geographical region of the hexagonal icon. An offline device may include any device that was previously detected to be online, but the session has ended unexpectedly. The dormant device percentage may be defined as the ratio of the number of dormant devices to the total number of devices. A dormant device may be a device that is available to be online but has not held a session for a predetermined period of time. A dormant device may include devices which are in a sleep mode or power-saving mode.

Figure 9:
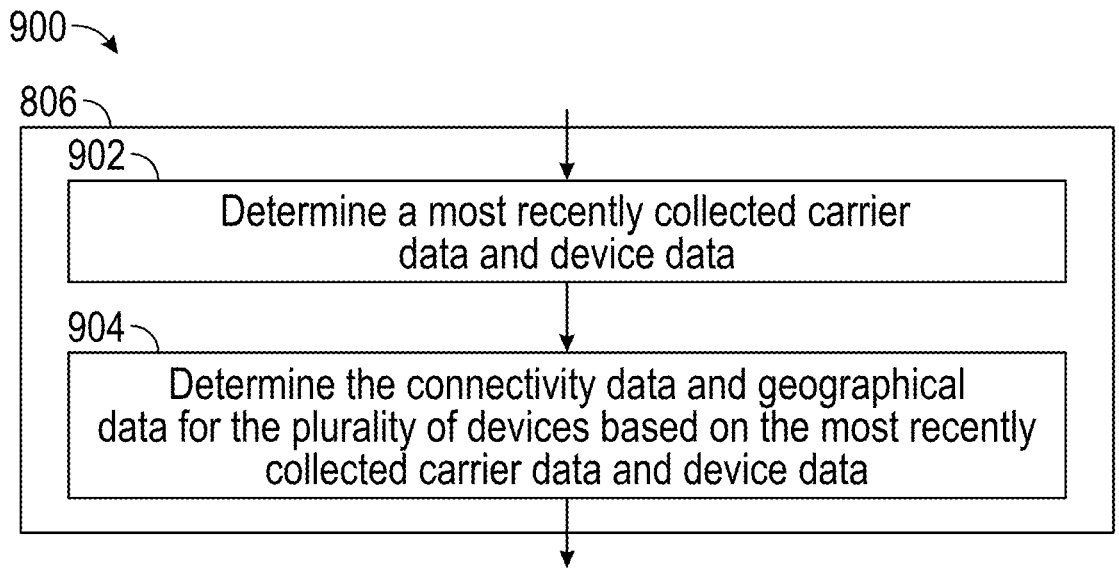
FIG. 9 shows a flowchart of an illustrative subprocess for determining connectivity data and geographical data for the plurality of devices based on the carrier data and the device data, in accordance with some embodiments of the present disclosure.

In some embodiments, control circuitry 104 may concurrently execute multiple instances of process 800 for more than one carrier, more than one geographic region, etc. FIG. 9 shows a flowchart of an illustrative subprocess 900 for determining
connectivity data and geographical data for a plurality of devices based on the carrier data and the device data, in accordance with some embodiments of the present disclosure. In some embodiments, subprocess 900 corresponds to step 806 of FIG. 8 and is executed by control circuitry 104 of the CMP 102. In some embodiments, subprocess 900 is executed by control circuitry 104 as part of a process to present connectivity data of devices on a centralized connectivity map.

At 902, the control circuitry determines a most recently collected carrier data and device data. In some embodiments, carrier data and device data update periodically or in real time. In some embodiments, the carrier data and device data is received by the CMP through communication circuitry. In some embodiments, the CMP may access carrier data or device data by request. In some embodiments, the control circuitry may access the carrier data from the carrier that is associated with an eSIM card on the device. The carrier data or device data may be updated based on a refresh timer with a refresh timer interval, wherein the updated carrier data and device data is accessible at each refresh timer interval. In some embodiments, a user of the connectivity map may manually refresh the connectivity map, where the CMP accesses the most recently updated carrier data and device data in order to determine the connectivity data and geographical data for each of the devices. In some embodiments, device data from a respective device may refresh more frequently than carrier data from the carrier that provides the cellular network connected to the respective device. In some embodiments, carrier data may be hours old, depending on the carrier and how often carrier data is sent/updated. Therefore, the carrier data may be outdated compared to device data. For example, carrier data of a device may be three hours old. However, if the device is connected to a Wi-Fi network the device may be polled by the CMP or the device may send device data more frequently than the carrier can provide carrier data. Therefore, the CMP may use timestamp data associated with the carrier data and the device data to determine the most recently collected data. For example, when carrier data and device data is inconsistent, the most recent data may be used to determine connectivity data and geographical data.

At 904, the control circuitry determines the connectivity data and geographical data for the plurality of devices based on the most recently collected carrier data and device data. When the CMP receives the most recently collected carrier data and device data, the CMP determines the connectivity data and geographical data for each of the devices. For example, a device such as a vehicle may be connected to a Wi-Fi network. Therefore, the CMP may determine the geographical location of the vehicle based on the device data of the vehicle when the location data from the carrier data is different and/or older than the device data. In a second example, the carrier data may indicate that there is no current data connection to the cellular network provided by the carrier, but the device data shows that there is currently a cellular connection with the carrier. Therefore, the carrier data is overruled by the device data. As another example, a device may not be connected to a Wi-Fi network and the most recently accessed device data has an older timestamp than the timestamp of the carrier data. Therefore, the carrier data may be used for determining the geographical data and connectivity data for the device.

Figure 10:
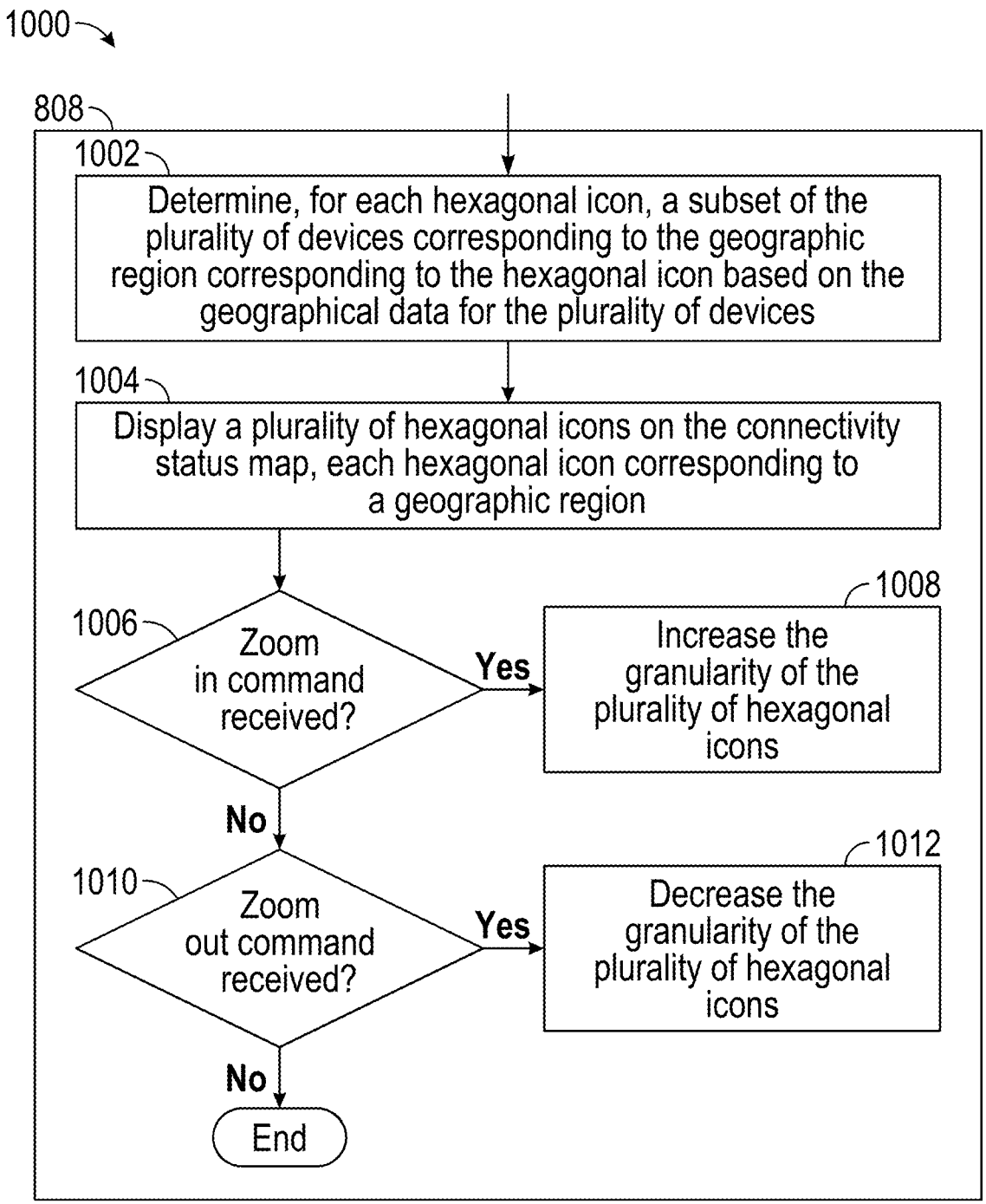
FIG. 10 shows a flowchart of an illustrative subprocess for facilitating for display the connectivity data for the devices on the CMP and adjusting the zoom of the connectivity map, in accordance with some embodiments of the present disclosure.

FIG. 10 shows a flowchart of an illustrative subprocess 1000 for facilitating for display the connectivity data for the devices on the CMP and adjusting the zoom of the connectivity map, in accordance with some embodiments of the present disclosure. In some embodiments, subprocess 1000 corresponds to step 808 of FIG. 8 and is executed by control circuitry 104 of the CMP 102. In some embodiments, subprocess 1000 is executed by control circuitry 104 as part of a process to present connectivity data of devices on a centralized connectivity map.

At 1002, the control circuitry determines, for each hexagonal icon, a subset of the plurality of devices corresponding to the geographical region corresponding to the hexagonal icon based on the geographical data for the plurality of devices. In some embodiments, the subset of the plurality of devices includes at least one device which is cellular-enabled or Wi-Fi-enabled.

At 1004, the control circuitry displays a plurality of hexagonal icons on the connectivity map, each hexagonal icon corresponding to a geographic region and the devices within the geographic region. In some embodiments, the CMP displays each of the hexagonal icons that have at least one device on the connectivity map. In some embodiments, the connectivity map is shown on the display of the CMP.

At 1006, the control circuitry determines if a zoom in command is received for the connectivity map. In some embodiments, a user of the CMP may select to zoom into the connectivity map, which causes the CMP to receive a zoom in command. When a zoom in command is received, the subprocess 1000 proceeds to 1008. When a zoom in command is not received, the subprocess proceeds to 1010.

At 1008, the control circuitry increases the granularity of the plurality of hexagonal icons. In some embodiments, steps 1002 and 1004 are performed again based on the increased granularity. In some embodiments, the CMP also zooms into the connectivity map, where each hexagonal icon represents a smaller geographical area, thus increasing the granularity of the connectivity data and device data for each hexagonal icon. When the connectivity map zooms into a subregion of a previously presented region, a respective hexagonal icon that represents a respective geographical area may be partitioned into multiple updated hexagonal icons, each of which represent a subarea of the respective geographical area. For each updated hexagonal icon, the devices are reassigned based on the geographical location of each device. In some embodiments, each updated hexagonal icon has a color and a fill size, which may correspond to an offline device percentage and a dormant device percentage for the devices located within the region of the updated hexagonal icon, respectively.

At 1010, the control circuitry determines if a zoom out command is received. In some embodiments, a user of the CMP may select to zoom out of the connectivity map, which causes the CMP to receive a zoom out command. When a zoom out command is received, the subprocess 1000 proceeds to 1012. When a zoom out command is not received by the CMP, the subprocess 1000 may terminate or wait until a zoom in or out command is received.

At 1012, the control circuitry decreases the granularity of the plurality of hexagonal icons. In some embodiments, steps 1002 and 1004 are performed again based on the decreased granularity. In some embodiments, the CMP also zooms out of the connectivity map, where each hexagonal icon represents a larger geographical area, thus decreasing the granularity of the connectivity data and device data for each hexagonal icon. When the connectivity map zooms out of a previously presented subregion, at least one respective hexagonal icon that represents a respective geographical area may be combined with multiple neighboring hexagonal icons to form fewer updated hexagonal icon. Each of the few updated hexagonal icon includes the connectivity data and device data for each device located within the region of the updated hexagonal icon. For each updated hexagonal icon, the devices are reassigned based on the geographical location of each device. In some embodiments, each updated hexagonal icon has an updated color and an updated fill size, which may correspond to an offline device percentage and a dormant device percentage for the devices located within the region of the updated hexagonal icon, respectively.

Figure 11:
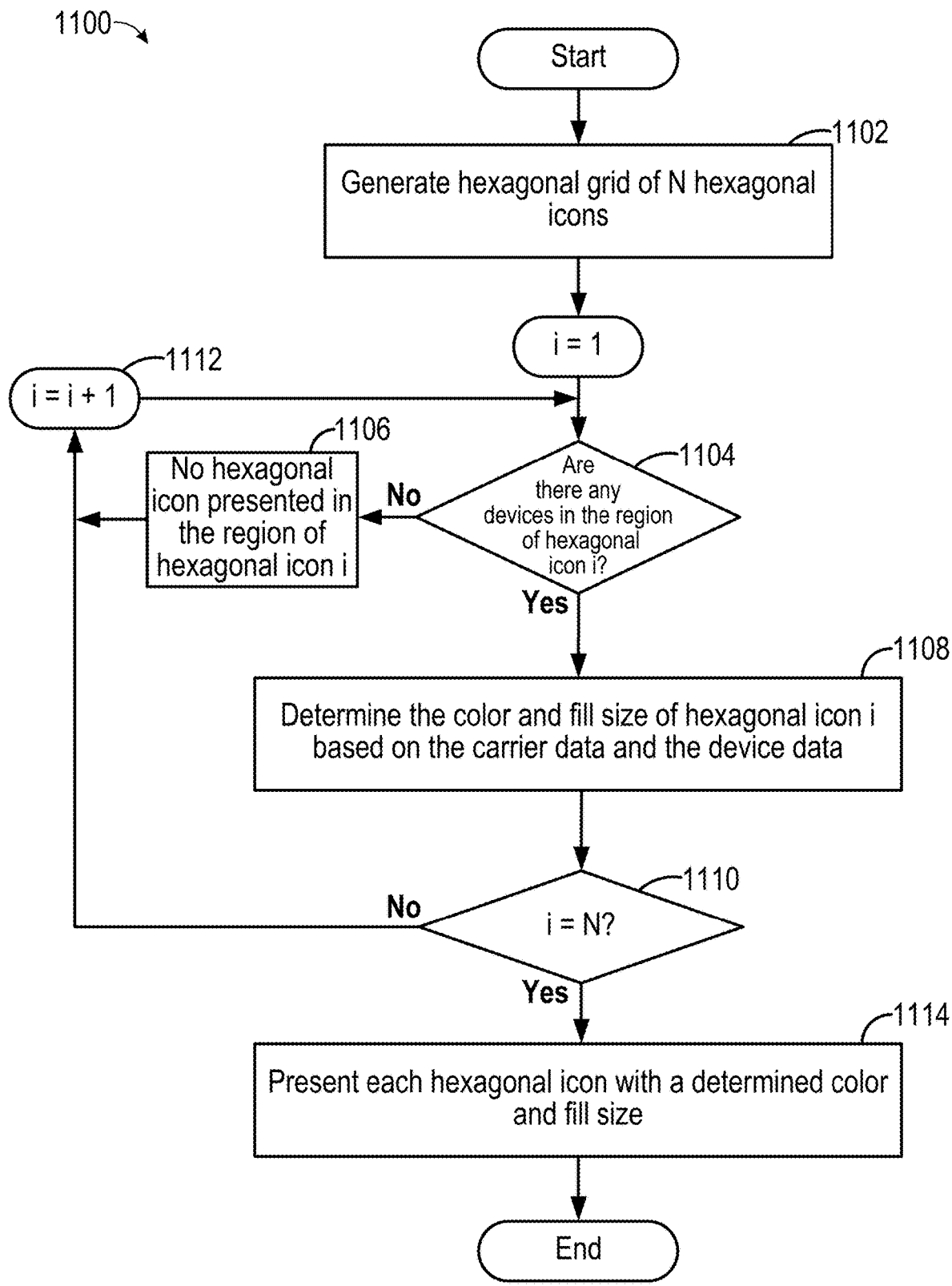
FIG. 11 shows a flowchart of an illustrative subprocess for determining the color and fill sizes for hexagonal icons, in accordance with some embodiments of the present disclosure.

FIG. 11 shows a flowchart of an illustrative subprocess 1100 for determining the color and fill sizes for hexagonal icons based on carrier data and geographical data, in accordance with some embodiments of the present disclosure. In some embodiments, process 1100 is performed in connection with step 808 of FIG. 8 and is executed by control circuitry 104 of the CMP 102. In some embodiments, process 1100 is executed by control circuitry 104 as part of a process to present connectivity data of devices in the form of hexagonal icons on a centralized connectivity map.

At 1102, the control circuitry generates a hexagonal grid of N hexagonal icons. In some embodiments, each hexagonal icon encompasses a predetermined area based on a current zoom of the connectivity map. In some embodiments, to generate N hexagonal icons, a total area of a viewable map is divided into N subareas. Each hexagonal icon represents one of the N subareas and is positioned to encompass the respective subarea. In some embodiments, the icons may be a different shape configuration (e.g., triangular or square), or a combination of different shape configurations. Hexagonal icons reduce the maximum number of adjacent icons at a given intersection, which reduces complexity of determining which icon a device is located based on the geographical data of the device. At 1104, the control circuitry determines if there are any devices in region i, based on the geographical data of each device. Each device having a geographical location within the region of hexagonal icon i becomes associated with the hexagonal icon i. When there are no devices in the region of hexagonal icon i, the process proceeds to 1106, where the control circuitry does not present a hexagonal icon for that geographical region. When there is at least one device determined to be within the region of hexagonal icon i, the process proceeds to 1108, where the control circuitry determines the color and fill size of the hexagonal icon i based on the carrier data and the device data.

At 1106, the control circuitry does not present a hexagonal icon i for the geographical region on the connectivity map.

At 1108, the control circuitry determines the color and fill size of hexagonal icon i based on the carrier data and the device data. In some embodiments, the color of hexagonal icon i may correspond to a percentage of offline devices to total devices that are geographically located within the region of hexagonal icon i. In some embodiments, an offline device may include any device that was previously detected to be online, but the session has ended unexpectedly. In some embodiments, the fill size of hexagonal icon i may correspond to a percentage of dormant devices to the total devices that are geographically located within the region of hexagonal icon i. A dormant device may be a device that is available to be online but has not held a session for a predetermined period of time. A dormant device may include devices which are in a sleep mode or power-saving mode. At 1110, the control circuitry determines if hexagonal icon i is hexagonal icon N.

When hexagonal icon i is not hexagonal icon N, the counter i is increased by the control circuitry at 1112. When hexagonal icon i is hexagonal icon N (i.e., the last hexagonal icon), process 1100 proceeds to 1114.

At 1114, the control circuitry presents each hexagonal icon with a determined color and fill size. In some embodiments the control circuitry presents each of the hexagonal icons that contain at least one device on the connectivity map. In some embodiments, the connectivity map is shown on the display of the CMP.

It will be understood that the illustrative steps of process 800 and subprocesses 900, 1000, and 1100, may be combined, omitted, or otherwise modified, in accordance with the present disclosure.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for displaying a plurality of hexagonal icons, each hexagonal icon corresponding to a geographical region, the method comprising:
   collecting, by control circuitry, carrier data for a plurality of devices from a plurality of carriers, wherein each of the plurality of devices being cellular-enabled or Wi-Fi enabled, or both;
   collecting, by the control circuitry, device data from the plurality of devices;
   determining, by the control circuitry, connectivity data and geographical data for the plurality of devices based on the carrier data of each of the plurality of carriers and the device data;
   determining, by the control circuitry, for each of the plurality of hexagonal icons, a subset of the plurality of devices corresponding to its geographical region based on the geographical data for the plurality of devices;
   determining, by the control circuitry, for each of the plurality of hexagonal icons, one or more icon attributes based on connectivity data for the subset of the plurality of devices corresponding to its geographical region; and
   displaying, on a display, the plurality of hexagonal icons on a connectivity map based on the determined one or more icon attributes.

2. The method of claim 1, wherein determining the connectivity data for the plurality of devices comprises determining an online status, an offline status, or a dormant status, or a combination thereof.

3. The method of claim 1, wherein:
   a color of each hexagonal icon corresponds to a percentage of devices within the geographic region corresponding to the hexagonal icon having an offline status; and
   a fill size of each hexagonal icon corresponds to a percentage of devices within the geographic region corresponding to the hexagonal icon having a dormant status.

4. The method of claim 1, further comprising:
   increasing a granularity of the plurality of hexagonal icons in response to zooming into the connectivity map; and
   decreasing the granularity of the plurality of hexagonal icons in response to zooming out of the connectivity map.

5. The method of claim 1, wherein the plurality of devices comprises a plurality of vehicles and a plurality of chargers.

6. The method of claim 1, further comprising:
   filtering the connectivity data based on one of the following filter categories: third-party company, carrier, geographic region, device type, or connectivity data type, or a combination thereof.

7. The method of claim 1, further comprising:
   displaying a call-to-action interface comprising at least one call-to-action button, each call-to-action button performs diagnostic testing, displaying device details, resetting device network settings, or resetting a device, or a combination thereof.

8. The method of claim 1, wherein:
   the device data is collected more frequently than the carrier data; and
   determining the connectivity data and geographical data for the plurality of devices comprises:
      determining a most recently collected carrier data and device data; and
      determining the connectivity data and geographical data for the plurality of devices based on the most recently collected carrier data and device data.

9. A system comprising:
   a display configured to display a connectivity map comprising a plurality of hexagonal icons, each hexagonal icon corresponding to a geographical region;
   communication circuitry configured to be communicatively coupled to each of a plurality of devices;
   control circuitry configured to:
      collect carrier data for the plurality of devices from a plurality of carriers, wherein each of the plurality of devices being cellular-enabled or Wi-Fi enabled, or both;
      collect device data from the plurality of devices;
      determine connectivity data and geographical data for the plurality of devices based on the carrier data of each of the plurality of carriers and the device data;
      determine, for each of the plurality of hexagonal icons, a subset of the plurality of devices corresponding to its geographical region based on the geographical data for the plurality of devices;
      determine, for each of the plurality of hexagonal icons, one or more icon attributes based on connectivity data for the subset of the plurality of devices corresponding to its geographical region; and
      display, on the display, the plurality of hexagonal icons on the connectivity map based on the determined one or more icon attributes.

10. The system of claim 9, wherein to determine connectivity data and geographical data for the plurality of devices based on the carrier data and the device data, the control circuitry is configured to determine an online status, an offline status, or a dormant status, or a combination thereof.

11. The system of claim 9, wherein:
   a color of each hexagonal icon corresponds to a percentage of devices within the geographic region corresponding to the hexagonal icon having an offline status; and
   a fill size of each hexagonal icon corresponds to a percentage of devices within the geographic region corresponding to the hexagonal icon having a dormant status.

12. The system of claim 9, wherein the control circuitry is further configured to:
   increase a granularity of the plurality of hexagonal icons in response to zooming into the connectivity map; and
   decrease the granularity of the plurality of hexagonal icons in response to zooming out of the connectivity map.

13. The system of claim 9, wherein the plurality of devices comprises a plurality of vehicles and a plurality of chargers.

14. The system of claim 9, wherein the control circuitry is further configured to:
   filter the connectivity data based on one of the following filter categories: third-party company, carrier, geographic region, device type, or connectivity data type, or a combination thereof.

15. The system of claim 9, wherein the control circuitry is further configured to:
   display a call-to-action interface comprising at least one call-to-action button, each call-to-action button performs diagnostic testing, displaying device details, resetting device network settings, or resetting a device, or a combination thereof.

16. The system of claim 9, wherein:
   the device data is collected more frequently than the carrier data; and
   to determine the connectivity data and geographical data for the plurality of devices, the control circuitry is configured to:
      determine a most recently collected carrier data and device data; and
      determine the connectivity data and geographical data for the plurality of devices based on the most recently collected carrier data and device data.

* * * * *